United States Patent
Aaltonen et al.

(10) Patent No.: US 10,056,798 B2
(45) Date of Patent: Aug. 21, 2018

(54) ELECTROMAGNETIC COMPONENT AND ELECTROMAGNETIC POWER UNIT

(71) Applicant: Quantum Electric Oy, Joensuu (FI)

(72) Inventors: Jari Aaltonen, Tohmajarvi (FI); Juha Hartikka, Kasama (FI); Jukka Kinnunen, Joensuu (FI)

(73) Assignee: Quantum Electric Oy, Joensuu (FI)

( * ) Notice: Subject to any disclaimer, the term of this patent is extended or adjusted under 35 U.S.C. 154(b) by 569 days.

(21) Appl. No.: 14/669,051

(22) Filed: Mar. 26, 2015

(65) Prior Publication Data

US 2015/0263577 A1 Sep. 17, 2015

Related U.S. Application Data

(63) Continuation of application No. PCT/FI2012/050927, filed on Sep. 26, 2012.

(51) Int. Cl.
| | |
|---|---|
| *H02K 3/04* | (2006.01) |
| *H02K 3/18* | (2006.01) |
| *H02K 21/12* | (2006.01) |
| *H02K 41/03* | (2006.01) |
| *H02K 1/08* | (2006.01) |

(Continued)

(52) U.S. Cl.
CPC .............. *H02K 3/18* (2013.01); *H02K 1/08* (2013.01); *H02K 1/27* (2013.01); *H02K 11/21* (2016.01); *H02K 11/33* (2016.01); *H02K 21/12* (2013.01); *H02K 41/031* (2013.01); *H02P 3/14* (2013.01); *H02P 6/34* (2016.02); *H02K 2201/12* (2013.01); *H02K 2213/12* (2013.01)

(58) Field of Classification Search
CPC .......... H02K 3/18; H02K 11/21; H02K 11/33; H02K 1/08; H02K 1/27; H02K 21/12; H02K 41/031; H02K 2201/12; H02K 2213/12; H02P 6/34; H02P 3/14
USPC ....... 310/201, 208, 71, 68 A, 68 E, 179–184
See application file for complete search history.

(56) References Cited

U.S. PATENT DOCUMENTS

| | | | |
|---|---|---|---|
| 3,160,837 A | * | 12/1964 | Jones ............ H01F 27/08 336/160 |
| 3,566,171 A | | 2/1971 | Tichy et al. ........... 310/180 |

(Continued)

FOREIGN PATENT DOCUMENTS

| | | |
|---|---|---|
| CN | 102214979 A | 10/2011 |
| GB | 2 364 181 A | 1/2002 |

*Primary Examiner* — Thanh Lam
(74) *Attorney, Agent, or Firm* — Harrington & Smith

(57) ABSTRACT

A basic electromagnetic component includes an electromagnetic circuit, which is composed of magnetic core and of coil and of one or more optional parts; of permanent magnet and/or of control unit. In the electromagnetic power unit motors, generators or linear motors implemented with basic electromagnetic components are connectable for different current and voltage values by changing the connections of electromagnetic components. An electronic switching module includes internal electronic or electromechanical switches and/or inverters which is composed of control unit to switch and invert polarities of sections of phase coils of an electric motor or generator during its operation and of at least two phase coil sets connected in series or parallel, or in combinations of these, and switching connections between phase coils or phase coil sets in series or in parallel to adjust power and speed in steps by using electric gears.

16 Claims, 17 Drawing Sheets

(51) Int. Cl.
  *H02K 1/27*   (2006.01)
  *H02P 3/14*   (2006.01)
  *H02K 11/21*  (2016.01)
  *H02K 11/33*  (2016.01)
  *H02P 6/34*   (2016.01)

(56) References Cited

U.S. PATENT DOCUMENTS

| | | | |
|---|---|---|---|
| 5,365,137 A | 11/1994 | Richardson et al. | 310/258 |
| 6,359,360 B1 | 3/2002 | Lungu | 310/168 |
| 6,737,951 B1 * | 5/2004 | Decristofaro | H01F 27/245 29/602.1 |
| 6,873,239 B2 * | 3/2005 | Decristofaro | H01F 3/14 148/108 |
| 9,013,084 B2 * | 4/2015 | Ruff | E04B 1/21 310/12.12 |
| 2006/0145548 A1 | 7/2006 | Wakita | 310/54 |
| 2007/0228736 A1 | 10/2007 | Smushkovich | 290/42 |
| 2011/0025067 A1 | 2/2011 | Cipriani | 290/52 |
| 2011/0109190 A1 | 5/2011 | Aoyama et al. | 310/216.074 |

* cited by examiner

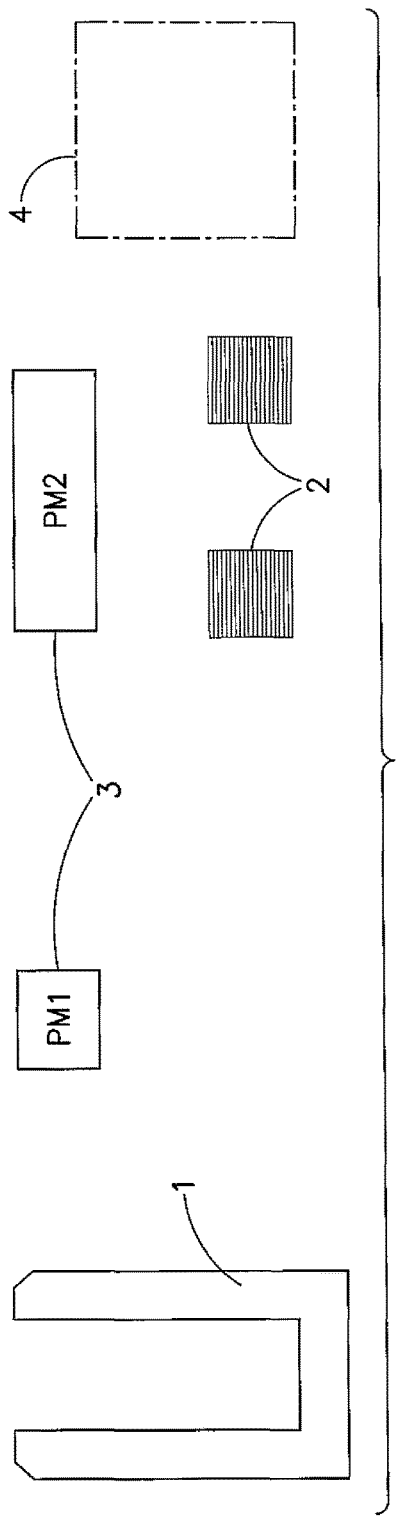
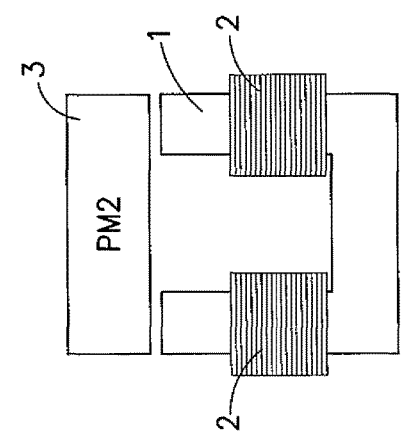
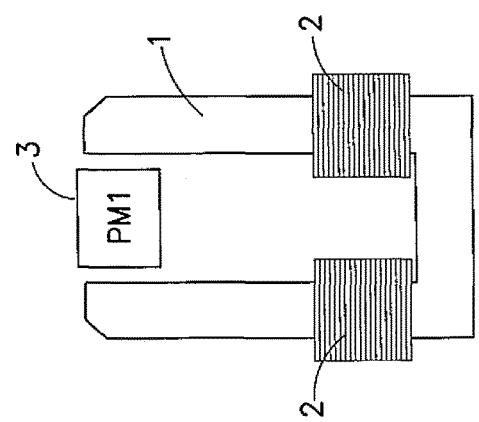
FIG.1
FIG.2a
FIG.2b

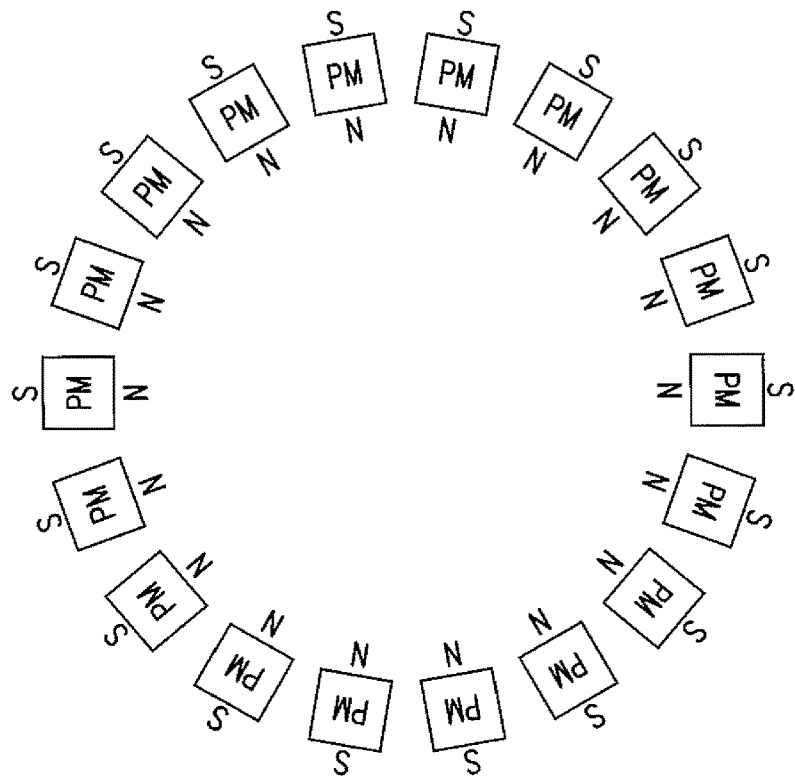
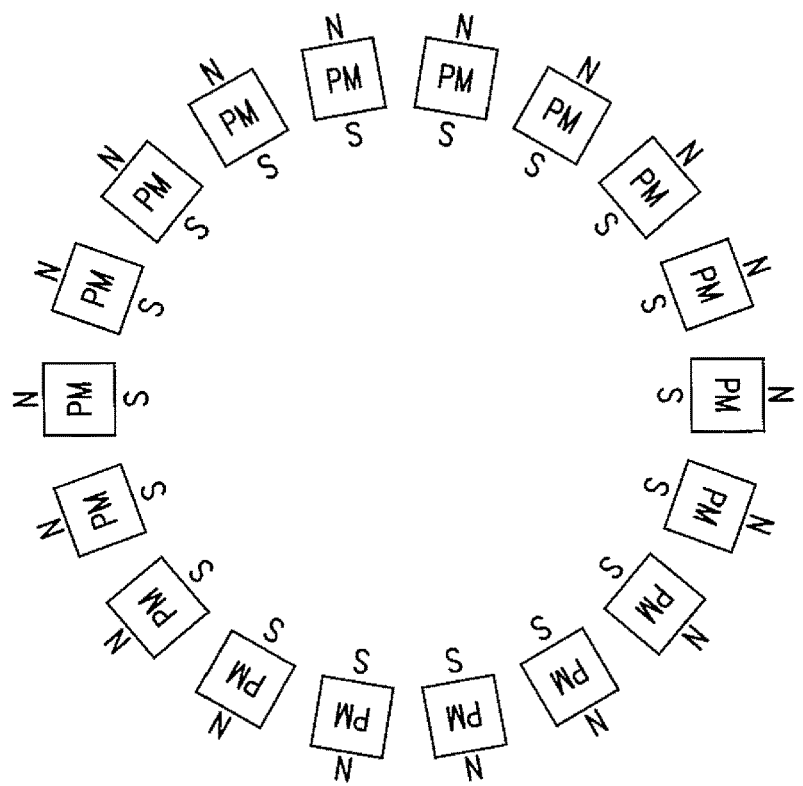

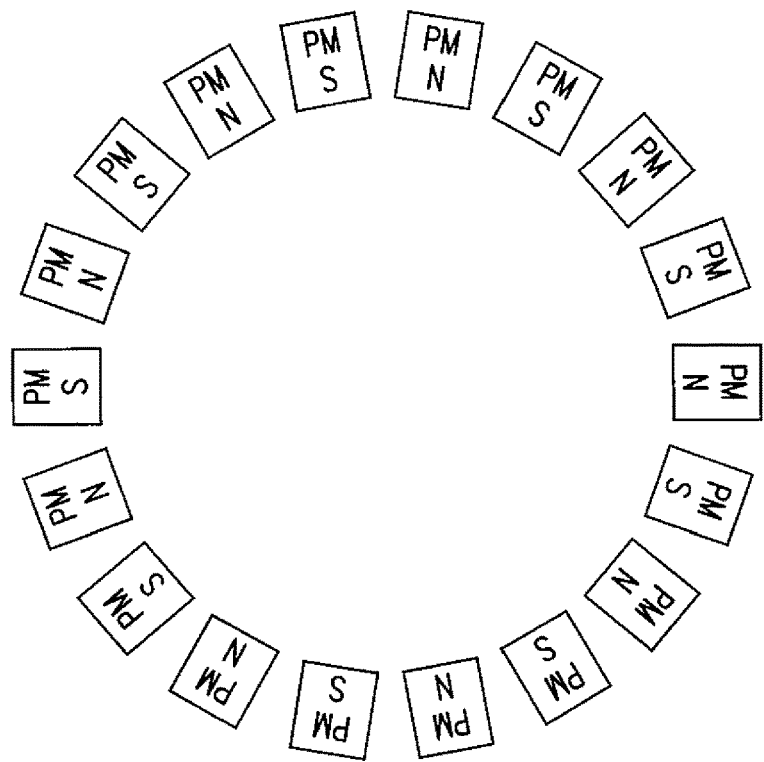
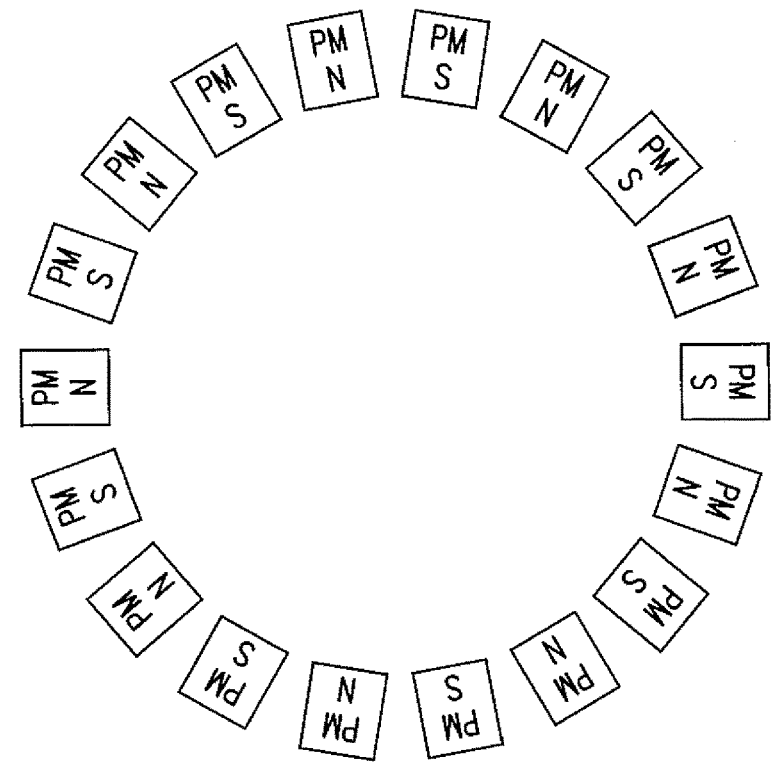

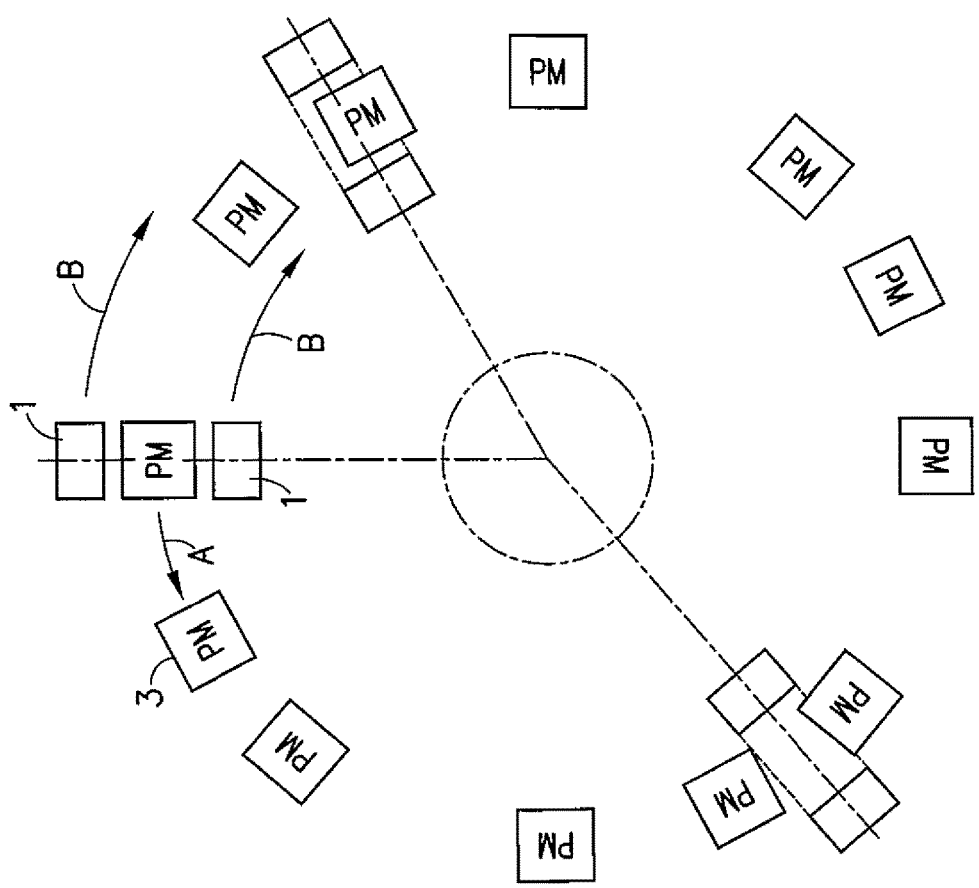

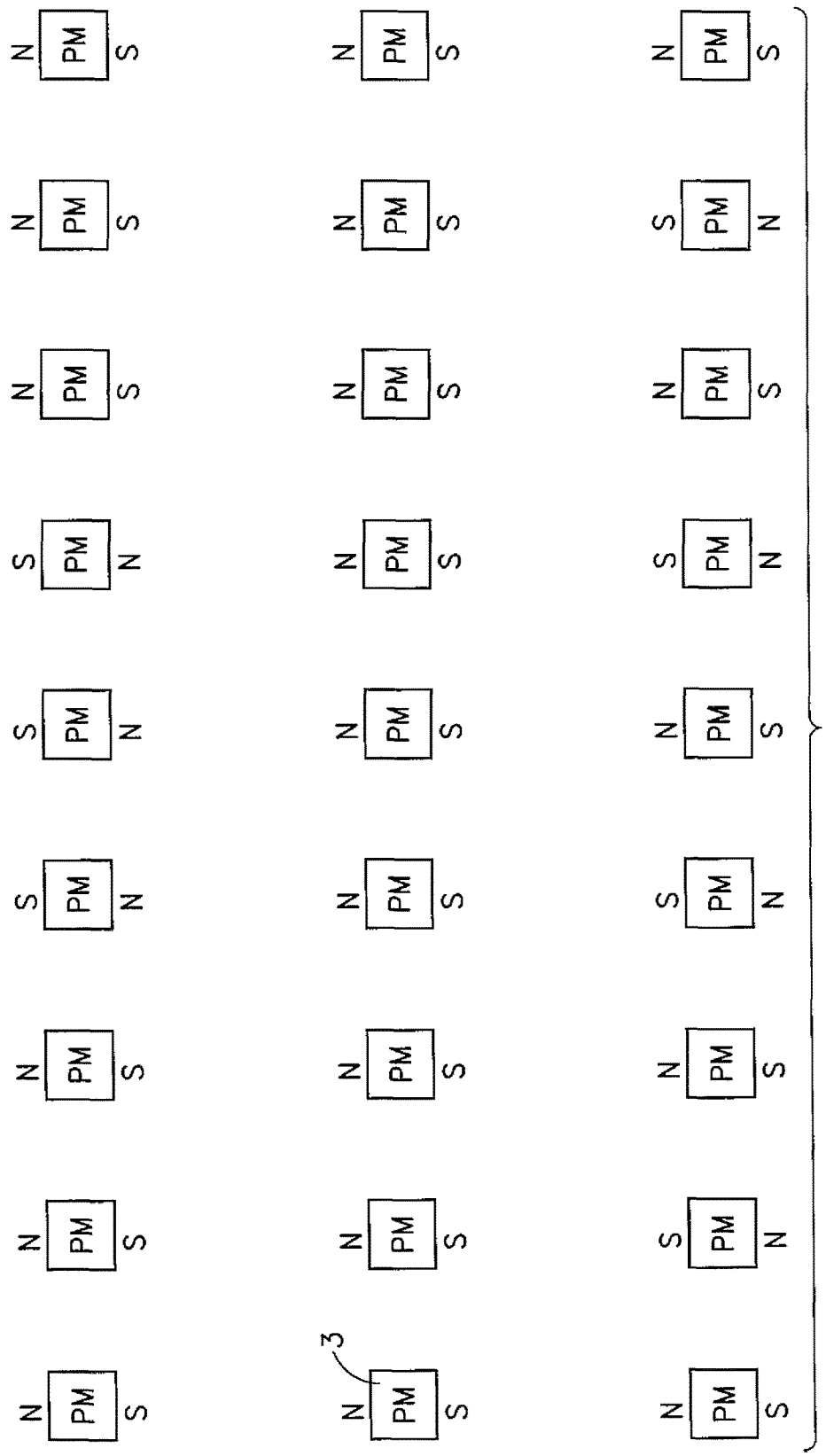

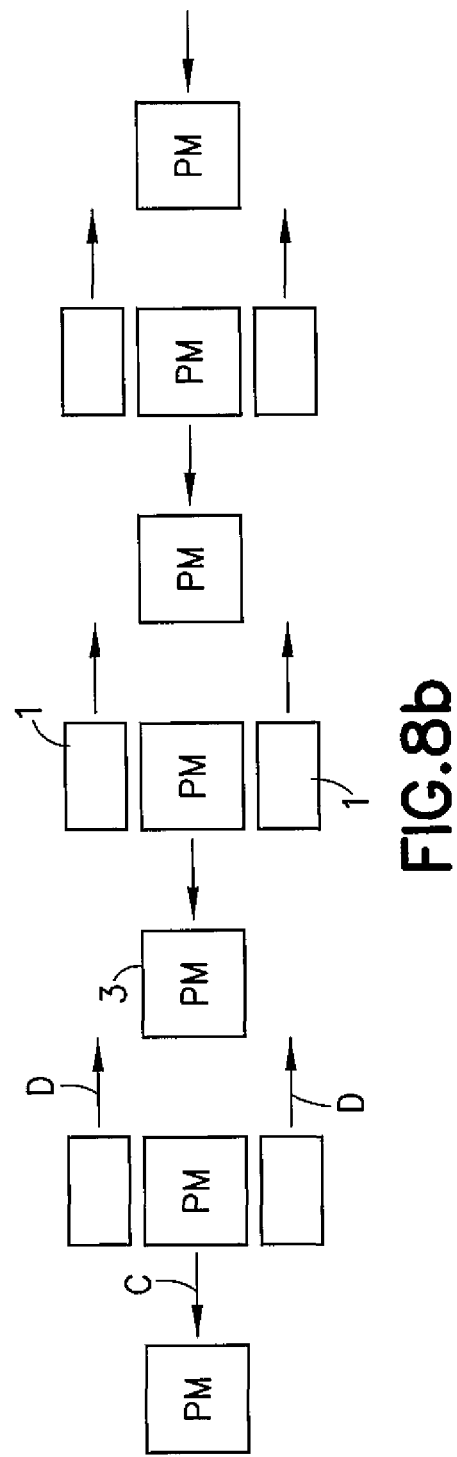

US 10,056,798 B2

ELECTROMAGNETIC COMPONENT AND ELECTROMAGNETIC POWER UNIT

CROSS REFERENCE TO RELATED APPLICATION

This application is a continuation of International Patent Application No. PCT/FI2012/050927 filed Sep. 26, 2012 which is hereby incorporated by reference in its entirety.

BACKGROUND OF THE INVENTION

Field of the Invention

The invention relates to a basic electromagnetic component. In addition, the invention relates to an electromagnetic power unit based on the basic electromagnetic component.

Description of Related Art Including Information Disclosed Under 37 CFR 1.97 and 1.98

Problems of present-day electromagnetic power units like electric motors, generators and linear motors, are that they are vulnerable to damage due to overload and difficult to repair and they have usually short life cycle and their materials are problematic to separate for recycling. Moreover, the construction of electric motors and other electromagnetic power units are complex, and they usually consist of a large and usually laborious to wind complicated magnetic core for coils.

Nowadays commercially available electromagnetic power units like motors are typically constructed by combining coils wound with copper and their iron cores together to form a single major unit, which cannot be dissembled for maintenance, repair or material separation and recycling. Used electric motors are at present collected as big piles in junkyards waiting for dismounting, because material separation of copper, iron and aluminum from them is so troublesome and time-consuming that the value of recycled metal is not worth the working time needed for metal separation.

Because electric motor coils and their iron core are wound together to create a single large unit, they are very difficult and tedious to repair to fix a coil damaged by overload, for example. That is why a motor with damaged coil is today usually not worth fixing, rather than replacing it with new one. Damaged electric motors end up in heaps of hazardous electric waste.

Current electric motors with their coils and cores built as a single large unit are manufactured typically suitable for only one or at most for two operating voltages, so that they must be produced as several various models if delivered for different operating voltages.

BRIEF SUMMARY OF THE INVENTION

An object of the invention is to introduce a basic electromagnetic component, which allows a new way of building electromagnetic power units. An other object of the invention is to introduce a new electromagnetic power unit. A particular object of the invention is to introduce a basic electromagnetic component, which significantly improves duration to overload, serviceability and repairability of electromagnetic power units. Moreover, an object or the invention is to introduce a basic electromagnetic component, which enables reuse of parts and recycling of materials of electromagnetic power units implemented with it.

The object of the invention is attained with a basic electromagnetic component and an electromagnetic power unit, which are presented in the claims.

The basic electromagnetic component according to the invention includes an electromagnetic circuit, which consists of separate basic parts; of U-shaped magnetic core, coil and one or more optional parts; permanent magnet(s) and/or electronic control unit, the basic electromagnetic component includes electronic or electromechanical switches or switching modules for connections between other basic components operated during motor or generator operation and at least two separate phase coils, the coils are pre-wound separately from the cores, and the coils are combined with the cores removable.

The magnetic core for coils is built of material suitable for the use. It may be built of transformer iron, or of other materials, like for example of ceramic or polymer based materials or other materials.

The permanent magnet or magnets used with basic magnetic component are common permanent magnets. Coils are typically wound with copper or aluminum. It is also possible to use other known materials for these parts. These and electronic control units implemented with semiconductors or relays are at the end of product life cycle separable from each other to be sorted for material recycling.

The invented new basic electromagnetic component for electric motor, generator or linear motor works by creating an electromagnetic force or momentum between itself and either synchronous motor permanent magnets (PM) or other similar basic electromagnetic components or in asynchronous motor applications between invented basic electromagnetic components and the squirrel cage rotor.

The invention utilizes a simple electromagnetic circuit of coil and core as a general-purpose basic electromagnetic component for electromagnetic power units, which replaces an entire complex and expensive model dependent combined coil and magnetic core unit manufactured for an electric motor or generator or a linear motor, and this way it simplifies and speeds up both designing and production ramp-up of these machines.

The developed basic electromagnetic component significantly improves duration of load, serviceability and repairability of electromagnetic power units. The component also enables reuse of parts of electromagnetic sources of power implemented with it, and makes them considerably more recyclable by making metals like copper and iron and aluminum alloys significantly easier to separate and sort for recycling.

Parts of the basic electromagnetic component can be used without permanent magnet for asynchronous motors and generators, like for polyphase induction motors. The new basic component enables connecting electromagnetic power units implemented with it for all usual direct current and polyphase means of electronic speed control. It is also suitable for building electric motors and generators and other electromagnetic power units for all usual classes of operating voltage, speed of rotation, electric power and torque.

In addition to recyclability and material separability, the invention allows varying the construction for low cost manufacturing techniques, minimizing number of different basic components needed for electric motors of different sizes and models, because most of them are feasible on the basis of the basic component according to the invention, without need to design and manufacture a complete structure of the electromagnetic circuit of an electromagnetic power unit. Parts of magnetic circuit are easy to produce as separate units and connect together and separate from each other to facilitate and speed up their serviceability and repairability.

The electromagnetic circuit according to the invention can to be used as a basic unit for various types of applications, like for synchronous radial flux or axial flux or for linear motors, for asynchronous motors, for electromagnetic generators of abovementioned types, and for various devices and applications, like for example electric gears, solenoids, electric locks, switches and measuring devices.

Motors, generators or linear motors built of basic electromagnetic components are connectable for various combinations of operating voltages and currents by changing connections between basic electromagnetic components. Typical options for connections between basic electromagnetic components are parallel connection and series connection and combinations thereof, and especially delta and gamma connections of polyphase motors. The component connections of motor or generator are also reconnectable during motor or generator operation with help of electronic or electromechanical switches, which allows maintaining optimal performance of electromagnetic power unit in every different load combination of speed of rotation and torque.

An electric motor constructed with basic electromagnetic components according to the invention is flexibly connectable for virtually all operating voltages, which enables replacing a variety of separate production models of electric motors with a single model based on the invention.

Because the operating voltage of a motor, generator etc. power unit based on the electromagnetic component according to the invention can later be changed to another simply by reconnecting coils, an electric motor is easier to adapt for another applications than conventional electric motors are.

Because coils of electric motors constructed with basic electromagnetic components according to the invention are separately replaceable, maintenance and repair of them is easy, which makes it worth repairing a motor to extend its service life instead of discarding a motor because of a damaged coil.

Present-day electric motors require rather laborious winding work in production, because the winding must be woven inside a maze-like magnetic iron core built as a complete unit. Instead, electric motors built with the basic electromagnetic components according to the invention require no winding work at all. Coils of the component are pre-wound already at the production stage of the basic component, separately from the cores, and they are combined with their cores easily. This allows fast machine winding of complete coils already before an electric motor implemented with components according to the invention is assembled in production.

The conventional structure of today's electric motors and other electric power units with winded coils usually allows using only round copper wire for coils, and the insulation between coils and cores cannot be made very good considering both the electric insulation and the thermal conductivity essential for cooling coils. Round wire contact surface is too small for good thermal conductivity with other layers of winding, which impairs its cooling, and thus significantly increases coil damage risk in cases of motor overload.

Instead of round wire, the coils of basic electromagnetic components according to this invention may be built of flat winding materials, which increase their area of thermal conductivity, this way improving cooling of coils, and thereby decisively improving motor resistance to overload. This of course extends service life of a motor built with basic electromagnetic components.

Magnetic cores and coils of today's conventional electric motors fit only a specific motor model, so every motor model of different size must be designed and built with its specific iron core and coil structure, together with specific tooling and manufacturing facilities. Instead, the variability of construction enabled by the basic electromagnetic components according to this invention allows adapting them for a large variation of motors and applications, which creates significant savings in production start-up, in material and component costs, and in direct manufacturing costs, because construction based on a single basic component usually speeds up assembly work.

The basic electromagnetic component according to the invention is suitable for use either alone, or more commonly together with a number of similar units. Its electromagnetic circuit can also be combined with other electromagnetic circuits of different sizes.

It can also be individually controlled, because it may be used for other applications, like for switches, for electric locks, for solenoids, for measuring units defining position and location, for servos and actuators, and for electric or magnetic gears.

The basic electromagnetic components according to this invention can be connected in parallel, in series, in gamma or delta, and in all combinations of the abovementioned, so that the properties of a motor, generator or other electric power unit can be changed or adjusted, like operating voltage, start-up current, torque and speed of rotation.

Because of the versatility of the component, the selection of different kinds of components in the final construction can be reduced, which allows considerable cost savings in design, manufacture, production start-up, maintenance and recyclability.

The basic electromagnetic components according to this invention are suitable to be connected either by a separate control unit, or it can imply control elements, which can be controlled either by wires, or wirelessly by optic fibre for example, or directly by optic sensor, or by any other method of wireless control.

E-Gear Function

Modular Electromagnetic power unit invention enables also the development of totally new electric motor and generator technology based on the invented means of electronic speed control with solid state 'electric gears'. The invented speed control is a multiphase electronic speed controller composed of switching modules connected to segments or sets of phase coils of an electric motor or generator, to perform an 'electric gears' (EG) function with no moving parts, to allow both very short term high electric peak power, and high efficiency over significantly wider electric power range than motors and generators with traditional polyphase or DC electronic speed controllers (ESC). The modular composition of the invented electronic speed controller allows driving a motor or generator constructed for any number of phases, to attain very smooth drive, and to operate with a wide range of voltage.

The invented means of speed control is suitable as well for DC as for single phase or polyphase AC power sources. Although the invention is suitable for practically all types of electric motors, the ones that benefit most of it are synchronous permanent magnet motors and generators used with vehicles requiring high peak power from light weight motors, like cars and other vehicles, working machines, elevators and aircraft, and exceptionally extensive adjustability and high efficiency over very wide electric power range, like windmills.

This invented electric or electronic means of extending motor or generator efficiency for a wider range of power reminds in some aspects the effect of a mechanical gearbox. When these invented gearbox-like electrical connections are used to adjust motor or generator performance, this function is called as 'electric gear' or 'electric gears' (EG). Contrary to usual mechanically or electromechanically controlled mechanical gearboxes like Electric Variable Transmission (EVT), the invented 'electric gears' functions completely electronically without any moving mechanical parts, which the EVT and similar gearboxes have. The electronic only property allows switching electric gears during motor or generator full power drive.

The invented electric gears operate by means of electronically switching segments or sets of motor or generator phase coils, without any means of mechanical transmission, although it extends the range of efficiency in similar manner to mechanical gears.

The invented electric gear action is realized by utilizing a modular construction of electronic speed controller so that each module electronically switches interconnections of phase coil segments of a motor or a generator, instead of the traditional way of mechanically operating separate transmission or gearbox with help of mechanical or electromechanical or hydraulic or pneumatic clutches.

One performance differences to mechanical gears is that the invented electric gears function is not able increase the maximum torque of an electric motor, like mechanical gears are. Another difference is that the invented electric gears are able to significantly increase electric power of a motor or a generator, which mechanical gears cannot do.

Similarity between them is that both mechanical and electric gears can extend electric motor efficiency over much wider range of electric power. Practical difference between invented electric gears and traditional mechanical gears is that the invented electric gears extend range of efficiency without any moving or wearing mechanical parts.

Because the invented electric gears means of speed control is able to extend electric motor range of efficiency, speed and power somewhat similar to mechanical gearbox, it can be used to replace entire traditional expensive mechanical actions, like gearboxes, clutches, transmissions, drive shafts, differential gears and brakes, advantageously with electronically controlled direct drive electric motors utilizing the invented electric gears function.

An operational advantage of the invented means of speed control with electric gear function is that it allows to shift electric gears smoothly and automatically during full power drive, without need to reduce power for operating clutch and gears required with traditional mechanical transmission.

Usual means of motor or generator power or speed control with common three phase electronic speed controllers is by switching its phase currents with a much higher cyclic frequency than its phase frequency, using pulse width modulation (PWM) for electric power adjustment.

High PWM cyclic frequency of traditional speed controller helps to attain smooth drive, but it also remarkably increases motor eddy current losses as a function of the switching frequency, as well as it increases switching losses within the speed controller. Another side-effect of high frequency PWM control is an audible whining or howling noise during motor drive.

Another already known means of power control is the Pulse Amplitude Modulation (PAM). There is no need for separate PAM function in the speed controller with the invented means of using electric gears function, because each electric gear in effect adjusts input voltage of motor by steps.

The same result as PAM adjusting effective input voltage is achieved with the invention in the motor end, by adjusting phase coil voltages by variations of their parallel and series connections, with this invention introduced as electric gears function.

The invented means of modular controller introduces a more efficient alternative for controlling electric motor or generator power. The invented controller solves the high frequency eddy current loss and switching loss problems by performing main power adjustment by combinations and variations of parallel and series connections of coil segments, the invention called as 'electric gears'.

Because the invented speed controller allows use of more than three phase drive, it enables motors and generators are driven smoothly and silently using simple low frequency Phase Width Adjustment (PWA) speed control, instead of the usual eddy current and switching losses inflicting high frequency Pulse Width Modulation (PWM) speed control. As the invented combination of multi-phase and electric gears and phase width adjustment speed controller functions together allow motor or generator be driven through most of its operation conditions without the less effective high frequency PWM means of power control, the required switching frequency is reduced down to phase frequency, which is the lowest frequency that a motor or generator can be operated with.

At the same time as the invented electric gears function together with PWA improves controller and motor electric efficiency by reducing eddy current and switching losses caused by the alternative traditional PWM, the multi-phase ability of the invented speed controller simultaneously allows a smooth and silent drive, because it allows motors and generators to be constructed for more phases than the usual three of conventional synchronous drives.

The invented means of speed control allows combining best properties of two traditional motor types: The smooth, almost switchless silent drive of brushed multipole DC motors is combined with durability, low weight and high efficiency of brushless synchronous three phase motors.

In addition to combining best virtues of known old types of motors, the invention introduces a new property: Motors and generators operated with the invented means of speed control have a performance superior to traditional brushed DC and brushless synchronous motors. The improved performance is caused by the extended electric power, operating voltage and efficiency ranges enabled by the invented electric gears operation.

Traditional three phase ESC's are typically built as units separate from motor or generator and connected to them by at least the three thick wires needed for high power three phase drive.

The invented modular multi-phase electric gear switching speed controller solves the increased connections problem simply by being built together with motor or generator.

More precisely, each of its similar switching modules are built together with each of motor phase coils or sets of phase coils, which are divided to coil segments, connected to the switching modules for invented electric gears operation by switching them in parallel or in series or in combinations of both.

Because the modular construction of the invented means of motor speed controller allows integrating controller modules in close contact with motor or generator phase coils or sets of phase coils, all high power switching connections between controller switching modules and motor or generator phase coils are done internally, eliminating need for complex external high power wiring.

A motor or generator with the invented means of speed control does no more require any mounting work to connect high power wiring between ESC and itself, like traditional speed controllers do. Power source is simply directly connected to the invented modular speed controller built together with the motor or generator, with: out any need to circulate multiple wires through a separate controller box, like with old-style separate ESC's.

Also, most small signal wiring, like rotation and alignment sensor and protective sensor connections, may now be built-in into the invented speed controller modules integrated with motor or generator phase coils. This of course further reduces mounting work needed, compared to a traditional three-phase only ESC, with its performance inferior to the invented modular multi-phase speed controller with electric gears.

For electric gear operation, the coils of the motor or generator are divided to a number of sections or segments, which connected together in combinations by the invented controller modules, each handling segments of windings of a certain phase coil, or a set of certain phase coils.

The number of these internal coil segments in each phase set of coils determines for how many electric gears they may be connected to. Each electric gear means a variation of coil segments of each phase winding connected either in series, or in parallel, or in combination of series and parallel.

The more coils or coil segments are connected parallel by the electric gear function, the higher is the motor electric power and torque. Switching phase coil parallel connections step by step for more series connections with the invented electric gears function reduces electric power and torque, and increases motor efficiency with low electric power.

One way to illustrate the efficiency increase implemented by the invented electric gears function is to think of the motor characteristic efficiency-torque curve. When using the electric gears parallel-series connection function of phase coils or coil segments, the characteristic efficiency-torque curve of a motor or generator is shifted to higher or lower electric power.

When a motor is switched for in series connections of phase coils or coil segments by the electric gears function, the characteristic efficiency curve of the motor slides towards low electric power. When the invented electric gears function is used for more parallel connections of phase coils or coil segments, the motor characteristic curve slides towards high electric power.

As a result, using the electric gears function of the invented means of speed control allows motors and generators run at their optimum efficiency for a significantly wider range of electric power than traditional motors and generators with fixed windings.

Second property added by the invented electric gears function is that the range of electric power of a motor or generator is extended. With traditional fixed winding synchronous motors, the only usual way of increasing its power is the gamma-delta switching action. With the electric gears switching action of segmented phase coils, the electric power increasing effect is usually limited by maximum allowed power loss, by torque limit, and by maximum speed of rotation of the motor or generator only.

Third feature the electric gears function allows is a 'universal voltage' property of electric motors and generators. This is a new property introduced with the invented means of speed control. It results directly from the electric gears function of switching coils or coil segments of each set of motor or generator phase windings either in series, or in parallel, or in variations of both.

For instance, when a traditional motor or a generator is wound for the highest voltage that it is used with, it does deliver its full power with this voltage. Higher voltage will overheat or even damage the motor, and lower voltage will rapidly decrease its power output. This is the reason why today's electric motors and generators are commonly available for fixed voltage use only, allowing only rather narrow voltage tolerance without significant power loss, or risk of damage. However, if these traditional fixed coils are tapped for intermediate connections, this way dividing the traditionally fixed coil to separately connectable segments, these segments may be connected not only in series, but also in parallel, and in variations of series and parallel. This is the 'electric gears' function of the invention.

When connecting half of the segmented coil parallel with the other half, also the motor operation voltage is divided by two. Now the motor or generator operates with its full power and performance with half of the original voltage of the traditional fixed winding. If each of the coil segments are further divided to two segments and connected in parallel again, the operating voltage of the motor is halved by each step of parallel connection. This is the way the invented electric gears function of speed control manages motor phase coils and/or phase coil segments or sections.

The wide operating voltage range provided by the invented electric gears is useful for quickly switching a motor between high voltage mains AC drive and low or medium voltage battery drive, or for driving with varying voltage sources like with super capacitors, for instance.

Correspondingly, the invented electric gears allow preserving good generator efficiency while adjusting and stabilizing its output voltage even in a variable speed use by the generator itself, without need for external voltage adjusting units. For example, the invented electric gears allow collect vehicle braking energy with good efficiency down to significantly slower speeds than with traditional fixed winding motors and generators.

The invented electric gears is exceptionally well suited for variable speed operation with windmills and other generators with different sources of variable power, while preserving good generator efficiency, and requiring no costly extra voltage transforming and stabilizing units for usual applications. For example, the invented means of motor speed control allows universal current use, meaning that generator output or motor brake function output voltage may be selected either as DC or AC.

The invented means of multi-phase speed control performs generator coarse output voltage and power adjustment by steps of electric gears, and fine output adjustment primarily by high efficiency phase width adjustment (PWA), secondarily supported by traditional but lower efficiency pulse width modulation (PWM). In addition to the preferred permanent magnet style motor or generator use, the invented means of speed and output voltage control with electric gears is suitable for practically all other usual DC and AC induction motor types. Maximum number of allowed phases is the number of phase coils or phase coil sets that the motor or generator is constructed with. In other words, multi-pole construction of a motor or a generator allows more phases to be used for their control, too, compared to motors with low number of magnetic poles. Such multipole synchronous motors and generators are favored for direct drive applications, because of their high torque.

Replacing the traditional three-phase synchronous motor technology with invented multi-phase electric gears operation allows not only smoother and quieter drive, but also low switching frequency, contributing to higher efficiency resulting from reduced eddy current and switching losses, as well as universal current use, and anew property of universal voltage operation.

Yet, these are not the only efficiency advantages with the invented means of speed control. Still more benefits of the invented multi-phase electric gears means of speed control are introduced, like the phase timing optimization for still higher efficiency, and for improved braking energy recovery, and for fine adjustment of torque, voltage and power.

So called 'sensored brushless motors' use rotation sensors for defining rotor position of rotation, to define correct moment for inverting and switching current for motor phase coils or sets of phase coils. Their electronic speed controllers are usually called as 'sensored ESC'. Sometimes they are also called as 'sensored inverters', because of their polarity inverting action.

The sensored ESC's of brushless motors actually work exactly like brushed commutators of traditional brushed motors, switching current and inverting polarity for motor phase coils at the correct moments of rotation, defined by sensors. Only the electromechanical commutator and brushes have been replaced with electronic sensors and power mosfet inverting switches.

Their rotation sensors usually sense rotor position by its angle of rotation not continuously but by steps. These steps are usually the coarsest ones required, without option to adjust their timing. Some rotation sensor sets are built as units which can be manually rotated to adjust timing of current switching for early or late. Early timing usually increases motor current, power and torque, but decreases its efficiency. Late timing of motor may increase efficiency and decrease current, but with reduced power and torque.

Because they are built for certain stepped moments of current switching only, these usual traditional sensor sets do not allow using means of advanced low loss power controls, like the phase width adjustment (PWA) mentioned above. So the PWA means of speed control must either be realized by software, or by a sensor unit capable of indicating rotor rotation angle by small increments, or continuously.

These kind continuously measuring rotation sensor units have been considered complex, because they require complicated wiring between motor and the separate ESC unit, so they have not been commonly adopted into use.

The invented modular means of speed controller allows a new way of solving the connection between controller and sensors. When the motor or generator and the modules of the invented speed controller are built together by the preferred way, with each controller switching module integrated with or in close connection with each phase coil unit, their angular position is defined by the angular position of phase coil units.

Because switching timing is defined by phase coil position, now controller modules are at the same time arranged for correct positions for sensor use. So the rotation sensors for each controller module can be built together with the module itself. This invented way of combining rotation sensors with phase coil switching controller modules eliminates need for complex wiring required for traditional separate rotation sensors and ESC's. In the invented modular means of speed controller the rotation sensors may be built in the modules, which allow using advanced sensors capable of sensing rotor angle of rotation either in fine steps, or even continuously. Further, continuous sensors enable using advanced low loss means of motor or generator control, like PWA and timing adjustment, resulting to increased efficiency and performance.

Typical applications that benefit from the invented modular multi-phase speed control technology are vehicles, working machines, power plants and aircraft. Of power plants, especially those harnessing natural weather related power with highly varying power levels benefit most, like wind power plants and wave power plants. For example, the invented means of control reduces both number of parts and weight of generator units of wind power plants, making them less expensive to build and maintain, as well as helping to improve their durability and resistance to high winds.

Because of its combined universal voltage and electric gears technology, the invented technology allows wind power plants to supply power with both slower and faster winds than conventional wind power plants.

With railroad and subway vehicles, the invented speed controller technology allows adopting a new implementation of combined train drive power, braking, and braking energy reuse for all axles and wheels of the railway carriage.

BRIEF DESCRIPTION OF THE SEVERAL VIEWS OF THE DRAWINGS

Next, the invention will be described with more detail by referring to accompanying drawings:

FIG. 1 shows parts of a basic electromagnetic component according to this invention separated from entity, FIG. 2A and 2b show various applications of the basic electromagnetic component according to this invention, FIGS. 5a, 5b, 5c and 5d show various alternatives for radial mounting of permanent magnets, FIGS. 6a, 6b, 6c and 6d show different applications of the invention for mounting permanent magnets either to rotor or to stator of an axial flux motor or generator, FIGS. 7a, 7b, 7c and 7d show various alternatives of mounting the permanent magnet of the electromagnetic component relative to U-cores, FIGS. 8a and 8b show various applications of linear motors and generators.

In FIG. 1 the three parts of the invention are separate from the entity: magnetic core 1, which is an U-shaped iron part in the applications on the left, a permanent magnet (PM1) 3 on the center left and an alternative permanent magnet (PM2) on the center right, two coils 2 on the below right, and on the far right the control unit 4. In other applications the core may have other shapes and/or it can be made of other material proper for the purpose.

In FIGS. 2 a and b the three above mentioned parts are combined to create an entity which is the electromagnetic component. Parts are optimized by their manufacture to be easily connected to each other, and also to be easily disconnected from each other for maintenance or for recycling and material separation.

In FIG. 2 a the permanent magnet (PM1) is mounted for movement between both ends of the U-shaped core, in which case the magnetic flux flows to the permanent magnet (PM1) between ends of the U-core. Coils are assembled around the arms of the U-core.

In FIG. 2 b the permanent magnet (PM2) is mounted for movement in front of the ends of the U-core, in which case the magnetic flux flows to the permanent magnet (PM2) from the ends of the U-core. Coils are assembled around the arms of the U-core.

In FIGS. 3 a and b the construction of the electromagnetic component is shown in the drawing on the right. The drawing on the left is a side view of the component.

Figure 4A:
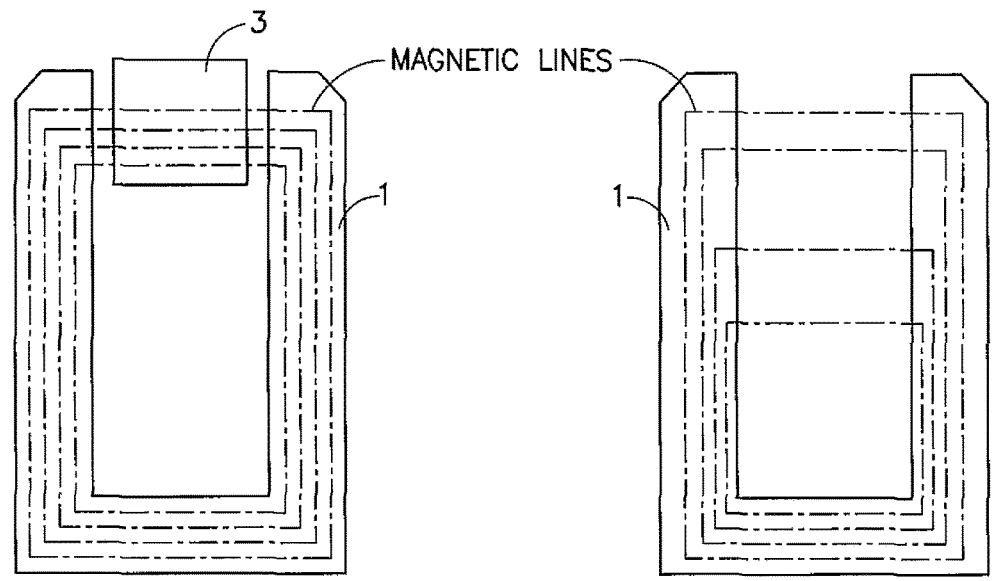
FIGS. 4a and 4b show magnetic fluxes of the basic electromagnetic component according to this invention in various cases.
Figure 4B:
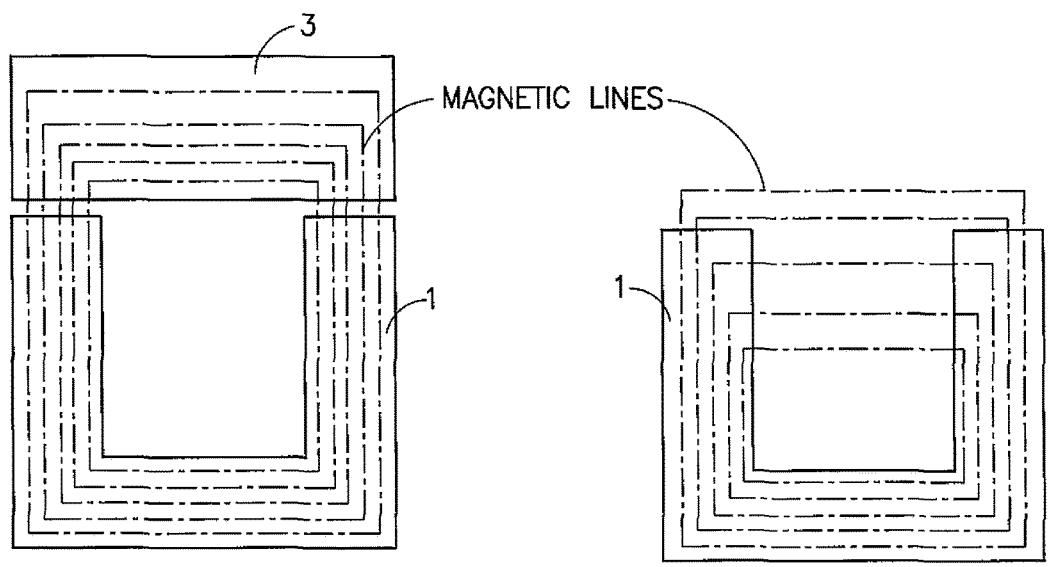

The right-hand drawing of FIG. 4 shows a magnetic flux of the electromagnetic component in the case that there is no permanent magnet (PM) in the magnetic circuit. In this case the magnetic fluxes are scattered inside the U-core. The left-hand drawing shows a case with a permanent magnet (PM) between ends of U-core, when the magnetic flux is gathered together by the permanent magnet (PM), which collects the lines of magnetic flux to create a closed electromagnetic circuit.

On the right of FIG. 4 b the magnetic flux of the electromagnetic component is illustrated in a case that there is no permanent magnet (PM) at the end of the magnetic circuit, in which case the magnetic fluxes are scattered inside the U-core. The left-hand drawing shows a case with permanent magnet (PM) ahead the ends of the U-core, in which case the magnetic flux is gathered together by the permanent magnet (PM), which collects the lines of magnetic flux to create a closed electromagnetic circuit.

For clarity, the coils have been left out in FIGS. 4 a and b although they in reality are there, either inducing magnetic field by electric current, or conducting electric current induced by alternating magnetic field.

Figure 5D:
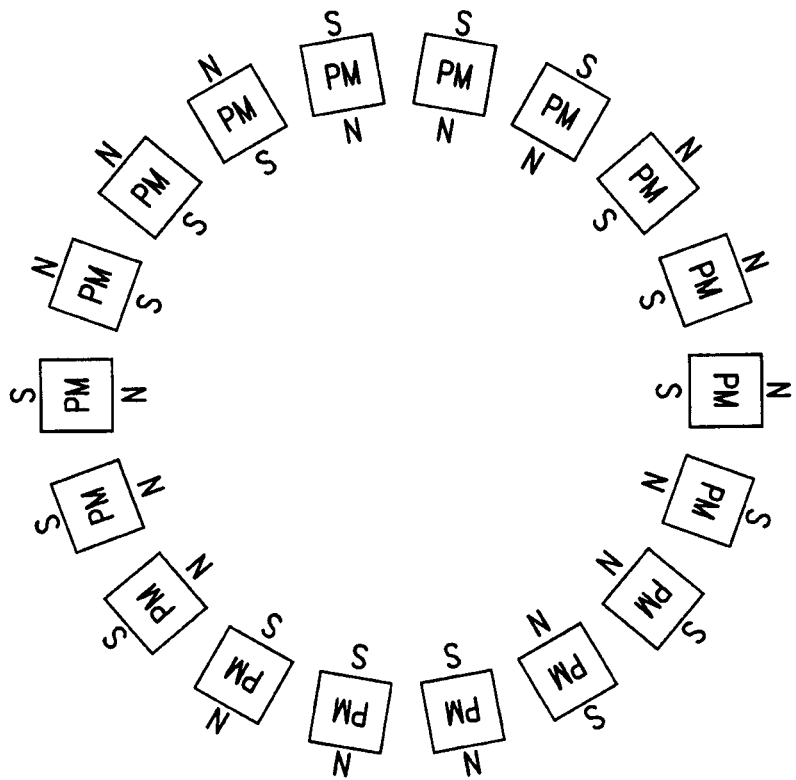
Figure 5C:
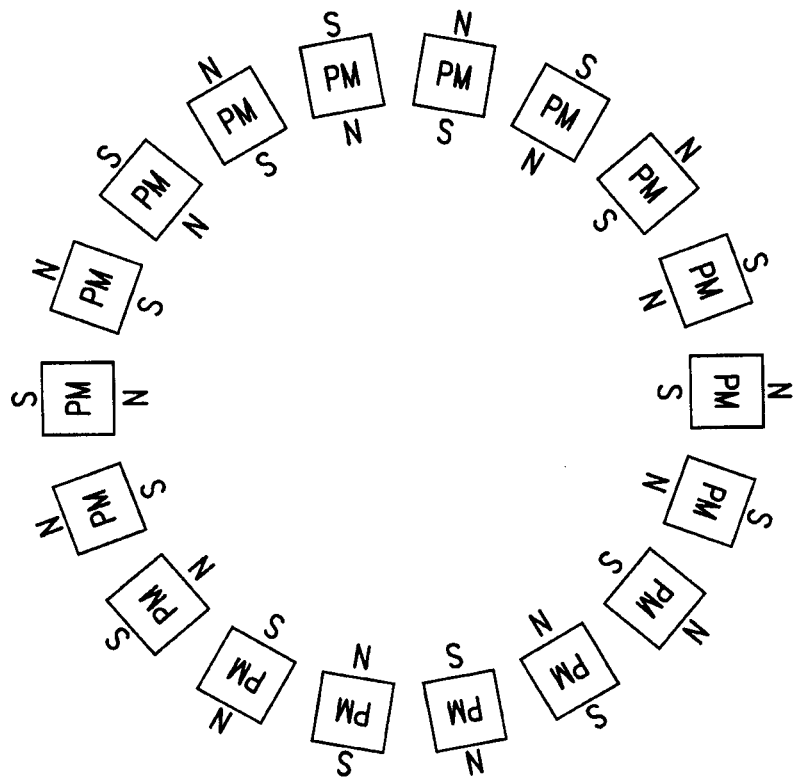

The FIGS. 5 a, b, c, and d show four different ways of mounting permanent magnets (PM) either in the rotor or the stator radially or parallel to the radius of motor and generator applications.

The FIG. 5 a shows a means of mounting permanent magnets either to the rotor or to the stator. In this drawing the north poles (N) of all permanent magnets (PM) are directed radially outwards.

FIG. 5 b shows a means of mounting permanent magnets (PM) either to the rotor or to the stator. In this drawing the south poles (S) of all permanent magnets (PM) are directed radially outwards.

The FIG. 5 c shows a means of mounting permanent magnets (PM) either to the rotor or to the stator. In this drawing the north poles (N) and the south poles (S) of permanent magnets (PM) are in turn directed radially outwards.

The FIG. 5 d shows a means of mounting permanent magnets (PM) either to the rotor or to the stator. In this drawing the north poles (N) and the south poles (S) of permanent magnets (PM) are mounted in arbitrary order, for example as sectors so that permanent magnets (PM) are directed either with their south pole (S) or north pole (N) radially outwards.

Figure 6D:
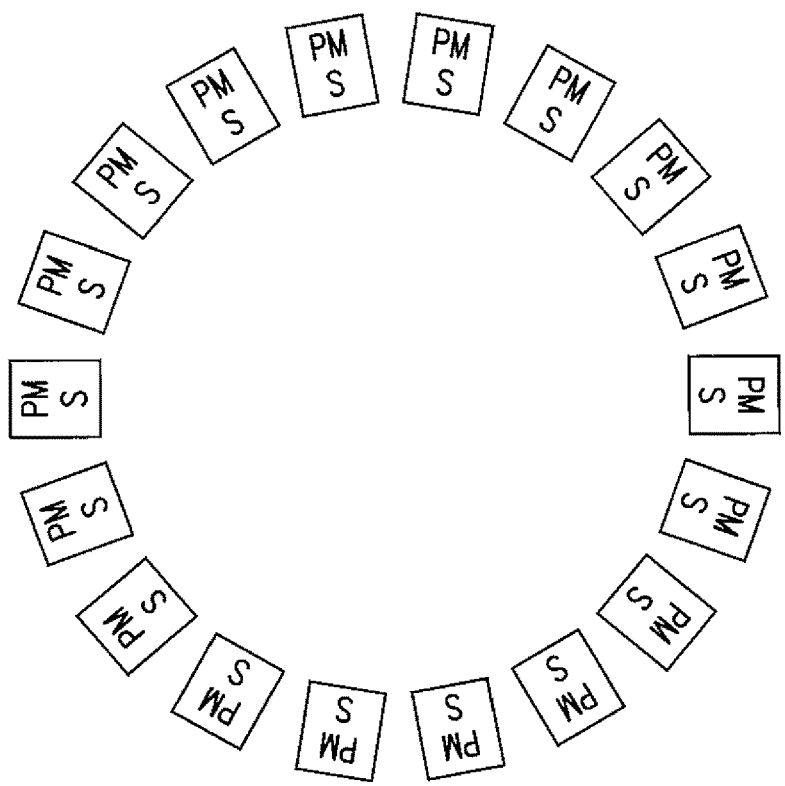
Figure 6C:
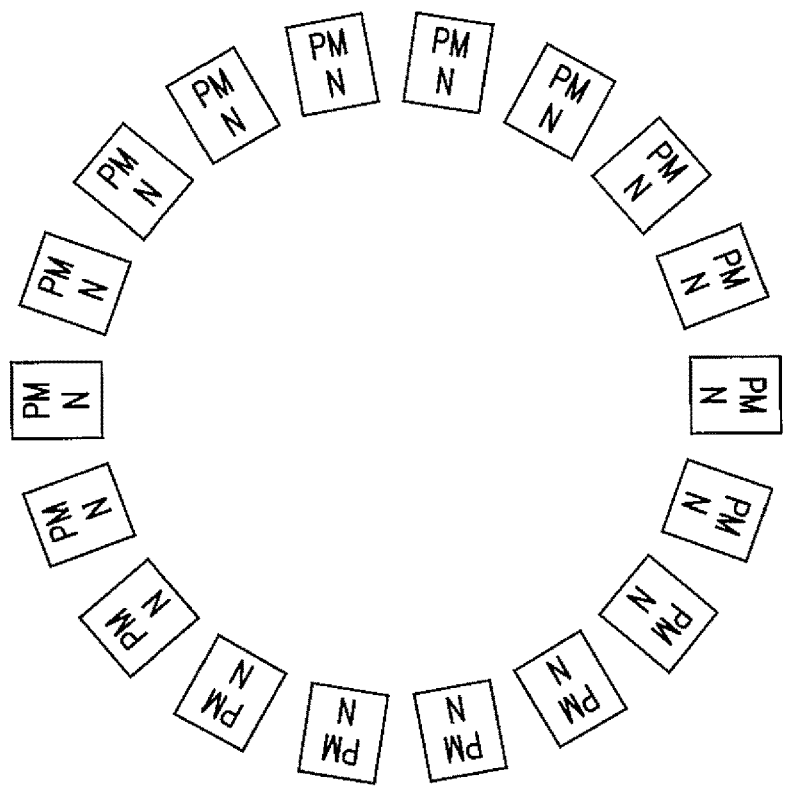

FIG. 6 a, b, c, d show placements of permanent magnets (PM) either to the rotor or to the stator.

The permanent magnets of FIG. 6 a are mounted from the level of the drawing with their north (N) and south (S) poles in turns towards the viewer.

FIG. 6 b shows the same ring of magnets as the FIG. 6 a, but seen from the opposite direction.

In FIG. 6 c all permanent magnets are mounted to the same direction in relation to the viewer. FIG. 6 d shows the same case as FIG. 6 c, but seen from the opposite direction.

Figure 7A:
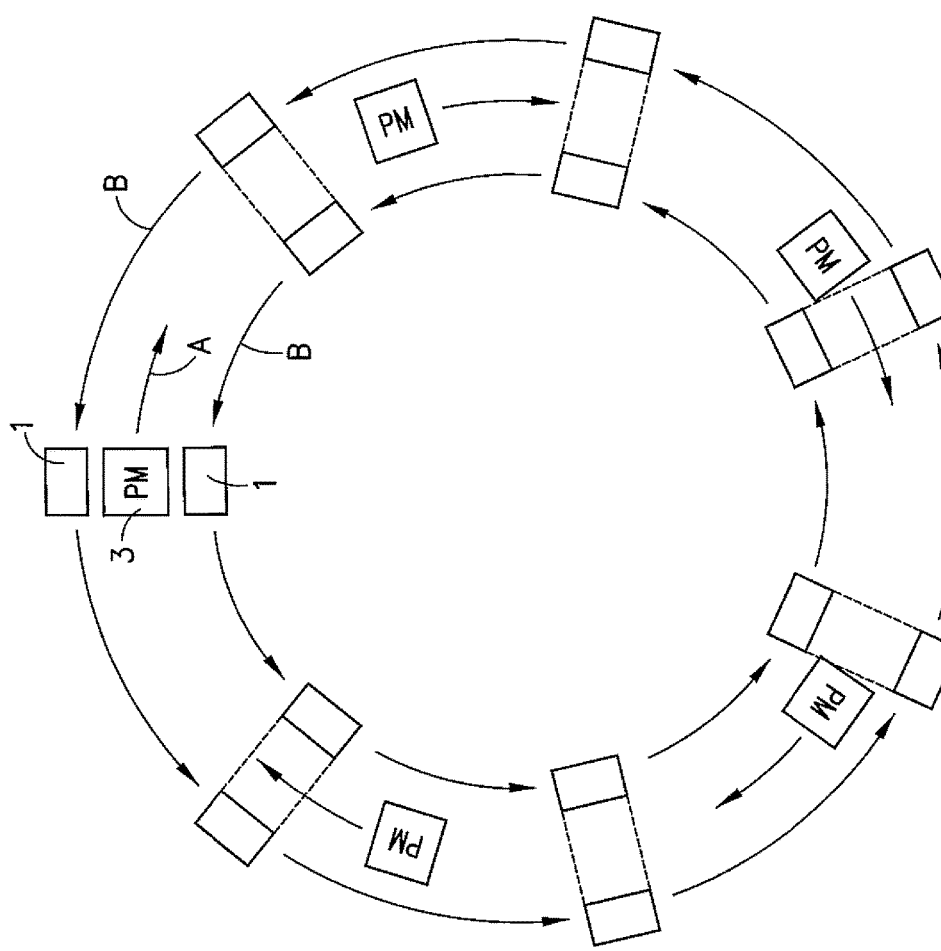

FIG. 7A, b, c, and d show means of mounting the permanent magnet (PM) of the electromagnetic component in relation to the U-cores.

Figure 7B:
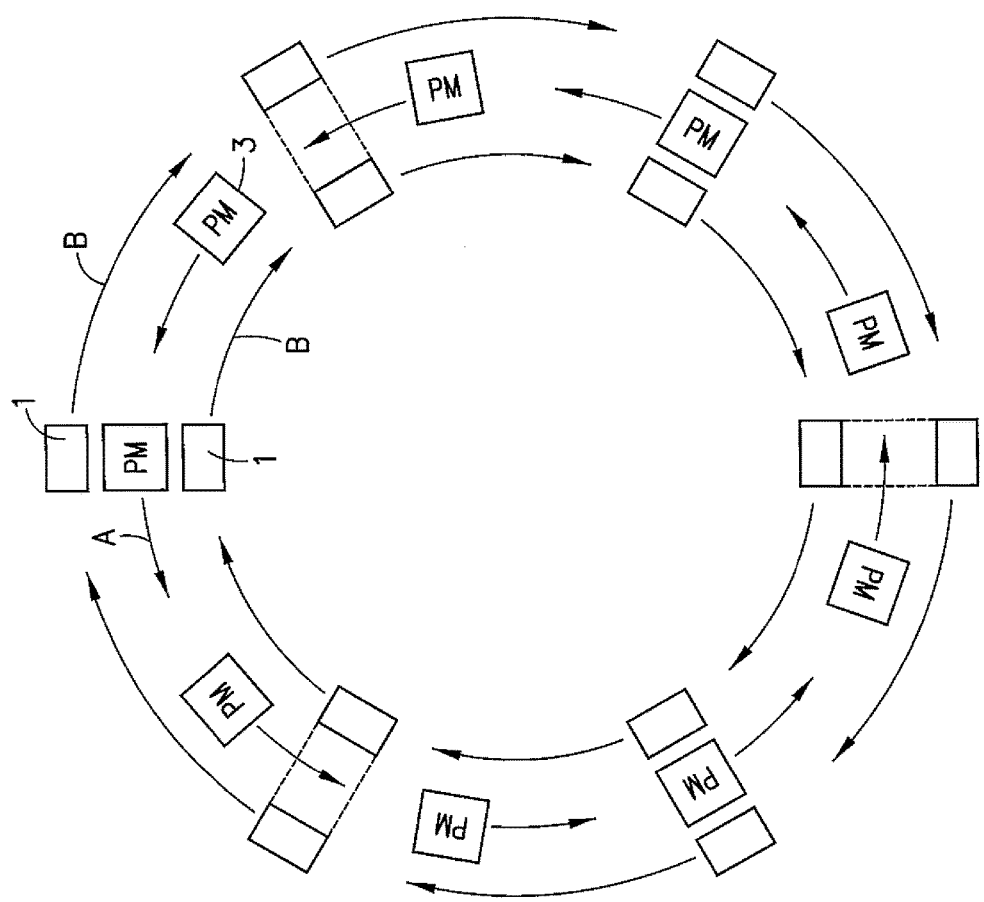
Figure 7C:
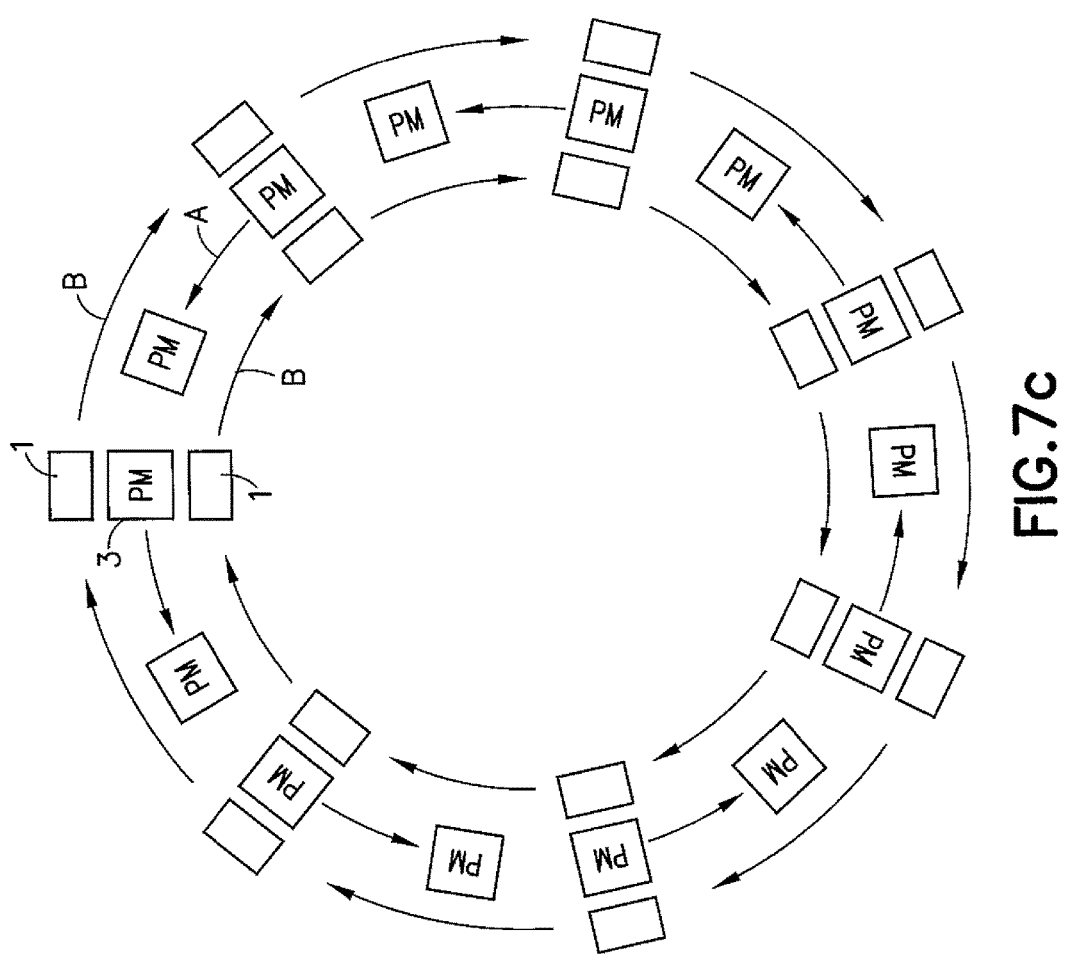
Figure 9A:
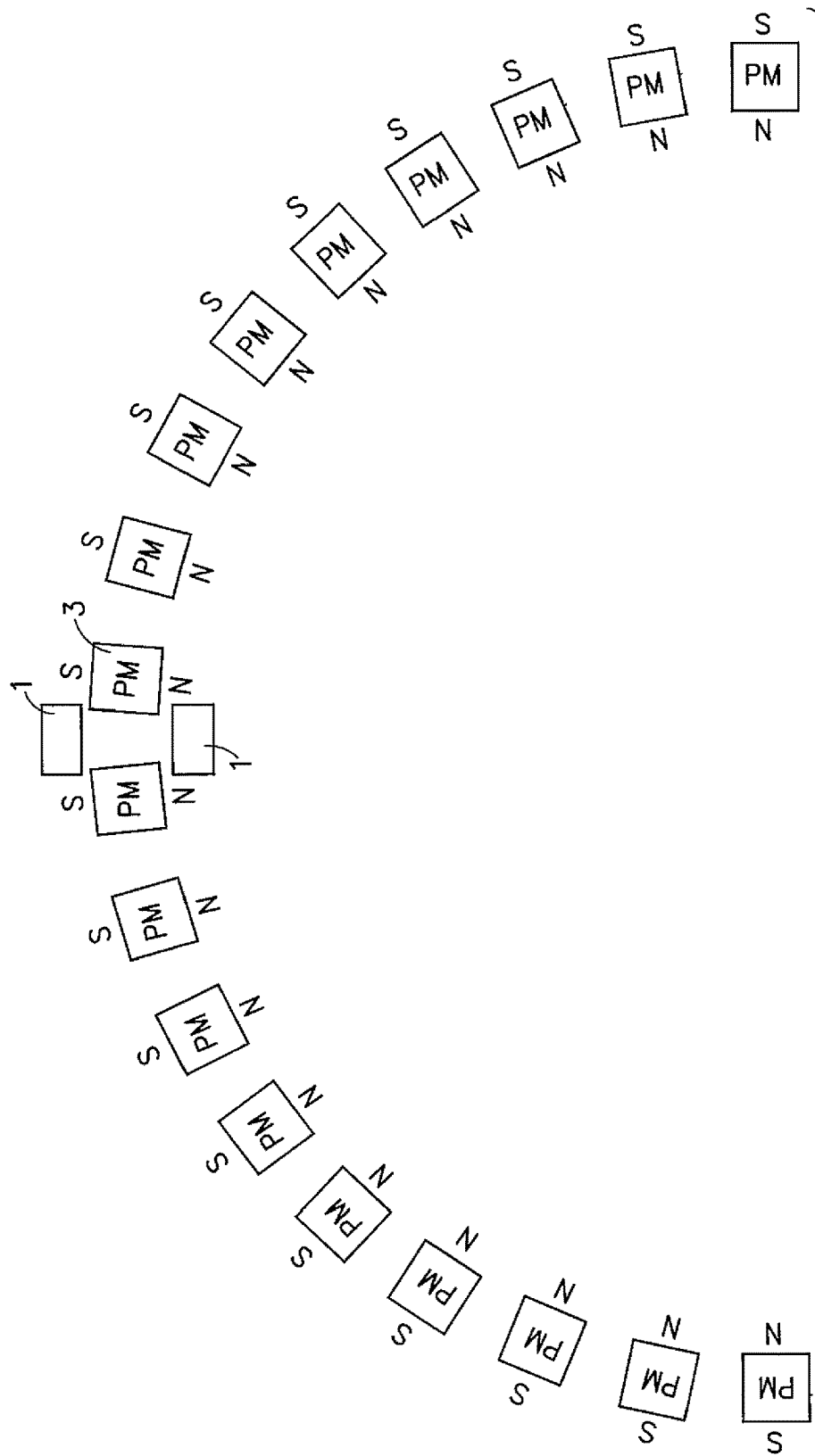
FIGS. 9a, 9b, 9c and 9d show some applications for servo control use of the electromagnetic component according to the invention.
Figure 9B:
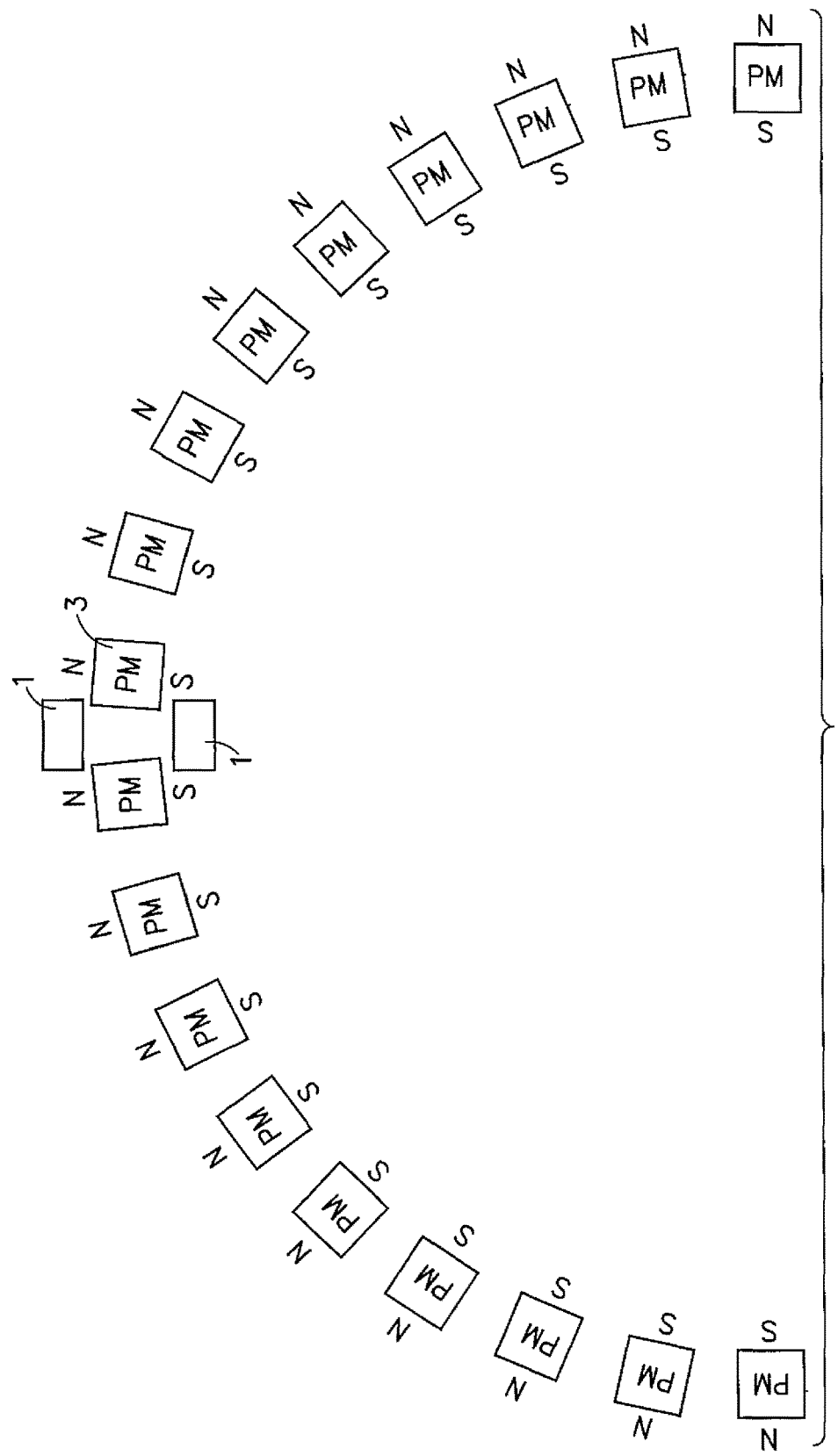
Figure 9C:
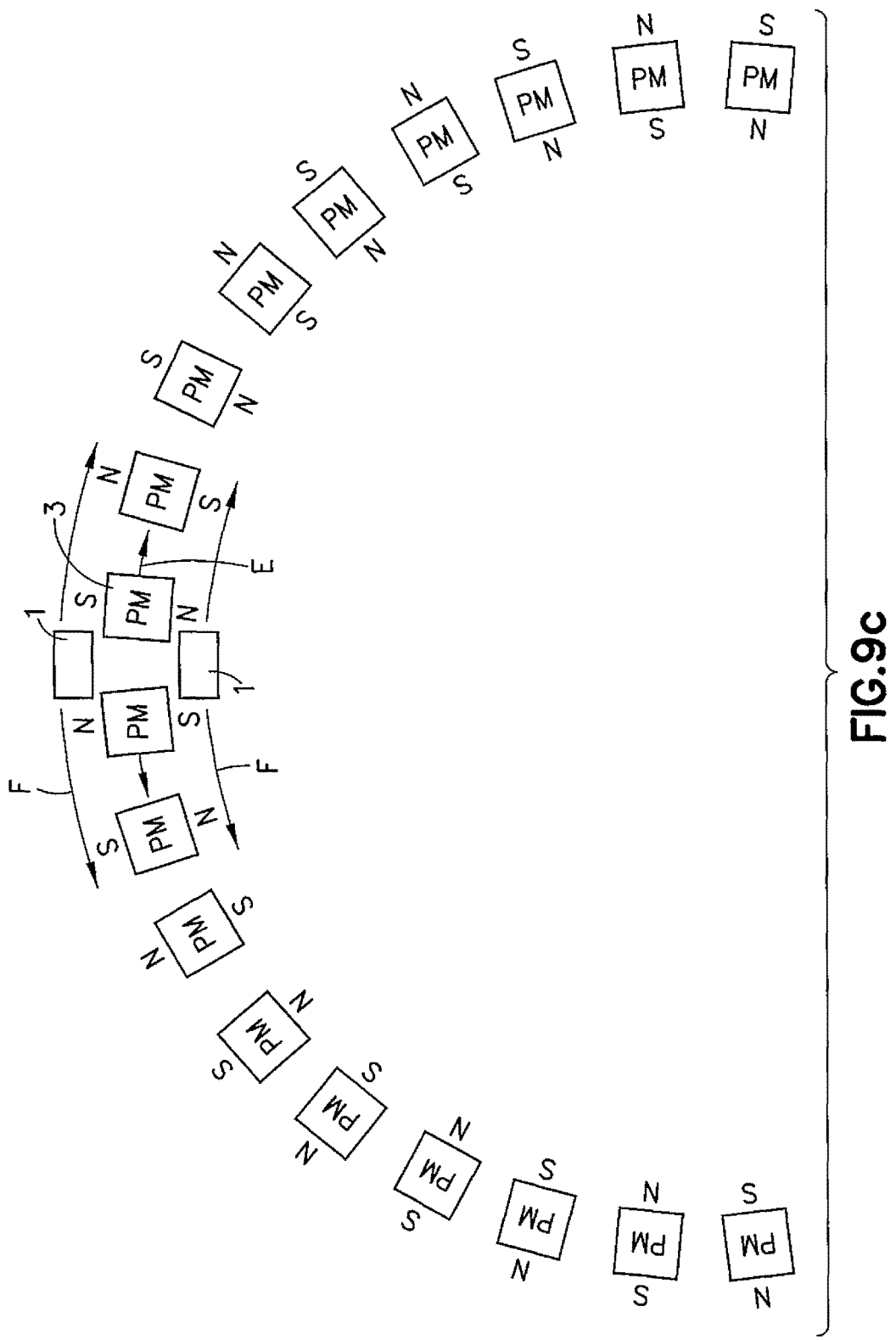
Figure 9D:
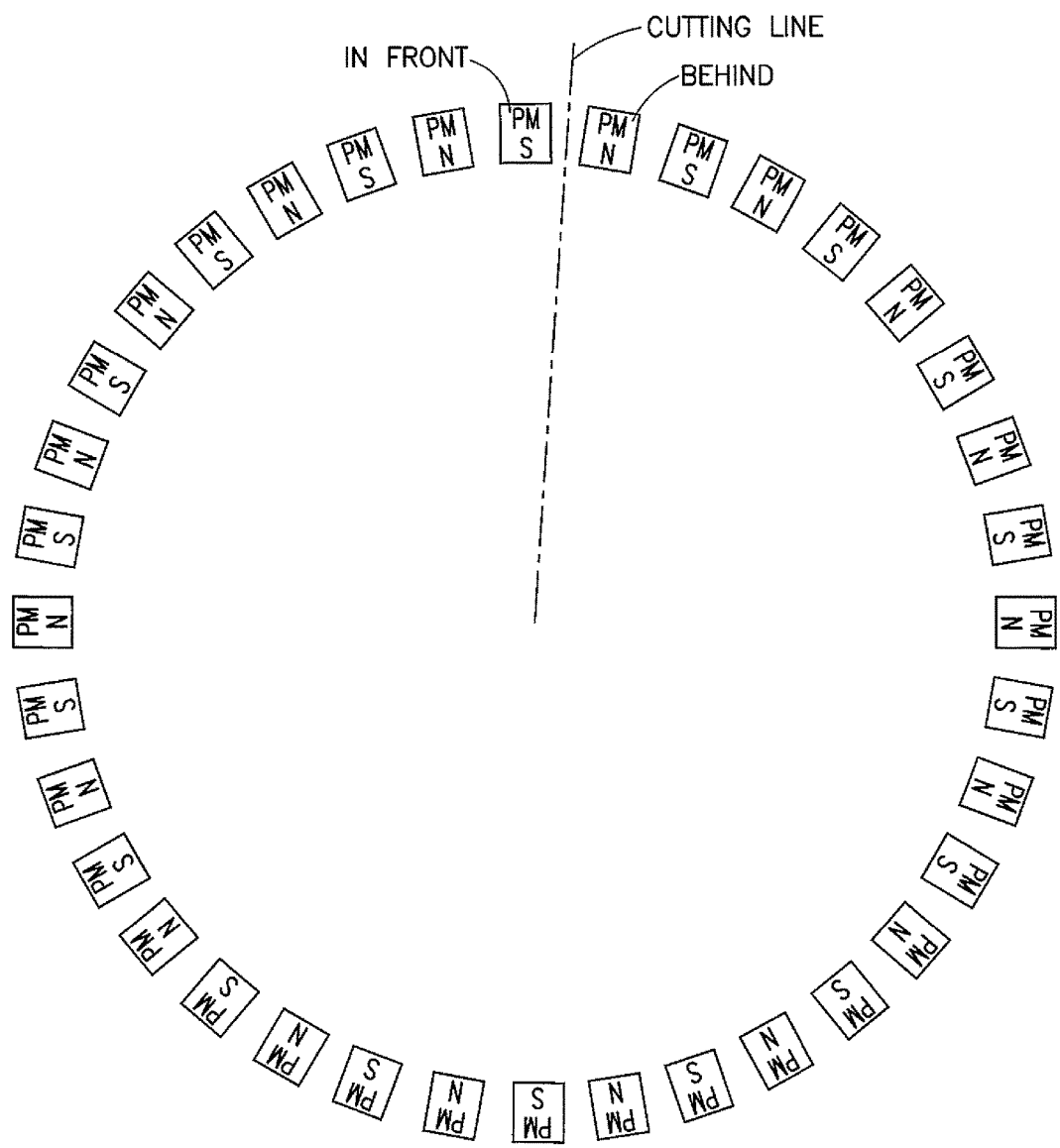

In drawings of FIG. 7 a are seven pieces of U-cores and 5 pieces of permanent magnets (PM). The purpose is to demonstrate that a motor or a generator implemented with the component according to the invention is, contrary to conventional synchronous and asynchronous motors, independent of equal spacing of the electromagnetic components, as well as independent of equal spacing of permanent magnets (PM) and U-cores. There may be one or more permanent magnets (PM) as well as one or more U-cores used.

Figure 3A:
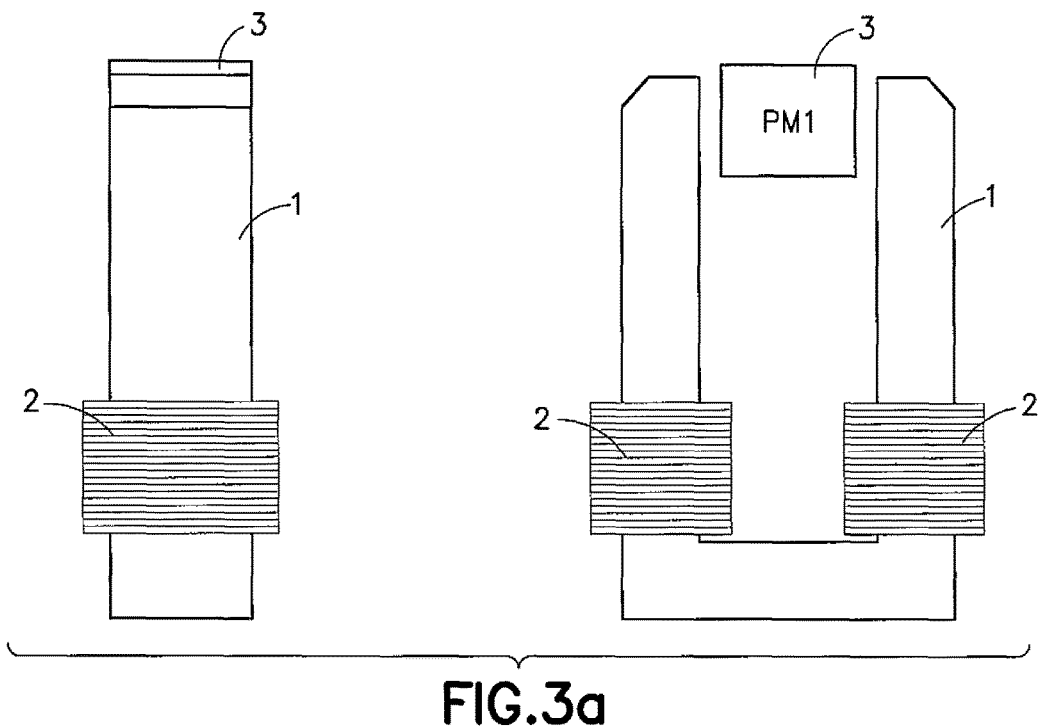
FIGS. 3a and 3b show side and end views of various applications of the basic electromagnetic component according to this invention.
Figure 3B:
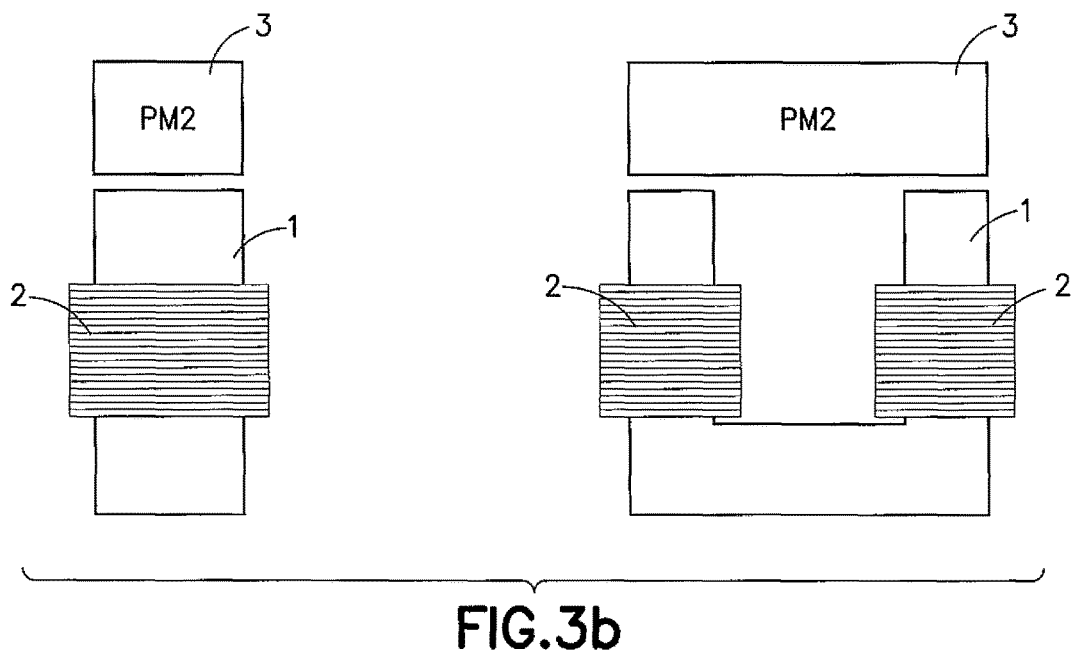

The arrow A indicates the direction of movement of the permanent magnet (PM) in relation to the U-core. Alternatively, the arrow B indicates the direction of movement of the U-core in relation to permanent magnet (PM). As the permanent magnet (PM) passes by the ends of the U-core, it induces electric current in the coil around the U-core, which is for clarity not drawn although it in fact is there. Alternatively, a current lead to the coil around the U-core induces a magnetic field lead by the U-core to a permanent magnet (PM) of correct polarity. Direction is determined according to whether the purpose is to pull or push the magnet in between the or out from between the U-core in alternative (PM1) of FIG. 3 a, or in front of the ends of the U-core in alternative (PM2) in FIG. 3 b.

The FIG. 7 b shows six pieces of U-cores and nine pieces of permanent magnets (PM). Motor or generator can be equipped as well with odd number as with even number of U-cores, and as well with even number as with odd number of permanent magnets (PM).

In FIG. 7 c there are unevenly spaced groups of 14 permanent magnets (PM) moving between seven U-cores. The drawing is intended to clarify the versatility of the invention allowing wide variety of configuration options.

The FIG. 7 d illustrates especially positioning options of U-cores and permanent magnets (PM).

In addition to rotating axial and radial flux motors and generators, the abovementioned variations are also suitable for linear motors and generators.

FIGS. 8 a and 8 b show different variations of linear motors and generators.

The FIG. 8 a illustrates variations of linear arrangements of permanent magnets. They can be either fixed, or they can be moving in relation to their environment. The polarities of the permanent magnets (PM) can either be varying like on the undermost line of the drawing, or the entire line of permanent magnets (PM) may have even polarities, or the polarities may alternate by segments or groups.

The drawing in FIG. 8 b shows the principle of a linear motor and generator implemented with the electromagnetic components according to the invention. The permanent magnet (PM) is placed between ends of the U-core. The arrow C in the drawing shows the direction of movement of the permanent magnet (PM) in relation to the U-core. Alternatively, the arrow D shows the U-core direction of movement in relation to the permanent magnet. When the permanent magnet (PM) passes the ends of the U-core, it induces electric current in the coil around the U-core, which is for clarity not drawn although it in fact is there. Alternatively, a current lead through the coil around the U-core induces a magnetic flux of desired polarity, which is led by the U-core to the permanent magnet (PM) to pull or push it either between the ends of the U-core (PM1) in FIG. 3 a or in front of the ends of the U-core (PM2) in FIG. 3 b.

FIGS. 9 a, b, c and d show using the electromagnetic component according to the invention for servo controls. In FIG. 9 a the permanent magnets (PM) are arranged as a semicircle. The electromagnetic component according to the invention may be utilized for servo controls, when the U-core is used to define or adjust position or location of the drive. The permanent magnets (PM) can for example be according to this drawing either with their south poles (S) oriented towards the outer peripheral, or by the FIG. 9 b oriented with their north poles (N) towards the outer peripheral.

In FIG. 9 c the poles of the permanent magnets (PM) are oriented in turns to opposite directions, either south pole (S), or north pole (N) outwards. The arrow E illustrates how the permanent magnets (PM) may move in relation to the U-core and the arrow F illustrates how the U-core may move in relation to the permanent magnets (PM).

FIG. 9 d illustrates a means to use the invention for a servo able to rotate more than 360 degrees, by placing the permanent magnets (PM) in a spiral or screw-like fashion, which allows very accurate axial movements.

The permanent magnets (PM) can also be placed in any order and with any spacing to form an arc. There may be one or more of them, as well as there may be U-cores one or more on the arc, and they may be spaced evenly or unevenly.

The means of control and final use of the electromagnetic component according to the invention determine placements and polarities of magnets in relation to the U-core.

Alternating polarities of permanent magnets (PM) allow simultaneous use of pulling and pushing magnetic forces, for example by pushing by magnetic repulsion one permanent magnet (PM) away from between or from in front of the ends of the U-core, at the same time as the ends of the U-core are pulling next permanent magnet (PM).

Permanent magnets (PM) as well as U-cores may be spaced either evenly or unevenly, provided that they are on the same radial or axial trajectory in relation to each other.

By the placement of the electromagnetic components according to the invention, the desired trajectory may be realized by placing any variation of permanent magnets (PM) and U-cores on different radiuses of the rotor and stator. The permanent magnets (PM) can be mounted as well to moving as to fixed parts of the motor or generator, and so can the U-cores, too. The electromagnetic components according to the invention may also be used to create electromagnetic forces of movement between each other, without using any permanent magnets at all.

In an axial flux motor or generator both the permanent magnets (PM) and the U-cores may be arranged as several rows tangentially to its axis.

The electromagnetic component according to the invention is also suitable for synchronous applications meant to rotate less than full circle. The arc of rotation is defined by the quantity of permanent magnets (PM) placed on the sector. There may be one or more U-cores used in one servo. The invention is also suitable for switches, solenoids, electric locks, and tools for technical measurements.

With the electromagnetic component according to the invention, the electromagnetic force causes a momentum between permanent magnet (PM) and the magnetic U-core, or between two magnetic U-cores, like with usual motors and actuators. Unlike the previous, the basic electromagnetic component according to the invention is a recyclable and reusable alternative to current difficult to repair or disposable electric motors and generators and other electromagnetic actuators, with their materials particularly difficult to separate for recycling.

The invented elemental electromagnetic component is designed to be installed as a single unit or as multiple units of basic coil and magnetic U-core pairs with one or more alternative parts, like combined units of permanent magnet and electronic switching unit, so that the invented basic electromagnetic components typically create a fixed stator, and the rotor is built either with permanent magnets (PM) or with other similar invented basic electromagnetic components, or the rotor can be of asynchronous type. The invented basic electromagnetic component is suitable for basic part of a rotor, in which case the stator is either built with permanent magnets (PM), or with other basic electromagnetic components according to the invention.

When used together with a permanent magnet (PM) for synchronous applications, the invented basic electromagnetic component will provide an electromotive force when the permanent magnet is positioned either between the ends of the U-core, or ahead of the ends of the U-core. When used for asynchronous applications, the object of magnetic force is likewise positioned either between or ahead of the U-core ends.

Diverging from common integrated coil and magnetic core constructions, the invention allows constructing electric motors and generators with arbitrary number of poles, both for synchronous and asynchronous power units, and for arbitrary number of phases with any phase angles, equally easily as for the standard polyphase with three phases. The invention also allows, when used with optional polarity reversing control unit, use with direct current, as well as use with alternating current.

While standard motors implemented with integrated coil and core units are typically built for only one rotor radius, and either for radial or axial magnetic flux only, the basic electromagnetic component according to the invention allows making rotating electric power units with the basic electromagnetic components mounted either radially to one or more different radiuses, or mounted axially to one or more rows parallel the rotating axle or shaft, or mounted as a combination of both.

When conventional motors and generators are typically built with either axial or radial magnetic flux arrangement, the invented basic electromagnetic component allows electromagnetic power units to be constructed with any direction of magnetic flux, enabling their use either as axial or as radial flux motors and generators, or as any combination of these, or with any arbitrary magnetic flux angle depending on optimal solution for each specific use.

The invention is designed for easy assembly in production without need for special tools and for easy dismounting for service and repairs or for recycling. Its materials are separable for recycling and reuse.

The invention is suitable for use with an optional electric switching unit controlled either electrically or optically, with either optical fibre or optoelectric sensor, or with any wired or wireless means of control, and it is not only suitable as a basic component for electric motors and generators, but also for switches, for electric locks, for servos, and for measuring apparatus intended for either linear or curved motion.

The invention is not limited to the preferred applications presented above but it may vary within the inventive idea of claims.

The invention claimed is:

1. A basic electromagnetic component, which includes:
   an electromagnetic circuit comprising, a U-shaped magnetic core, at least two separate phase coils, and a permanent magnet; and
   electronic or electromechanical switches for connecting the at least two separate phase coils to phase coils of other basic electromagnetic components during motor or generator operation of the basic electromagnetic components, wherein the at least two separate phase coils are pre-wound separately from the U-shaped magnetic core, and the at least two separate phase coils are combined with the U-shaped magnetic core removable.

2. The basic electromagnetic component according to claim 1, wherein the at least two separate phase coils are built of flat winding material.

3. The basic electromagnetic component according to claim 1, wherein the basic electromagnetic component includes an electronic switching module including the electronic or electromechanical switches and an inverter comprising a control unit to switch and invert polarities of the at least two separate phase coils during the motor or generator operation, the electronic switching module comprising means for switching connections of the at least two separate phase coils and the phase coils of the other basic electromagnetic components between a series connection, a parallel connection, and combinations of series and parallel connections to adjust power and speed of a motor or a generator, constituted by the basic electromagnetic components, in steps so as to implement electric gears.

4. The basic electromagnetic component according to claim 3, wherein the electronic switching module comprises one or more electronic speed controller units or control units.

5. The basic electromagnetic component according to claim 3, wherein the electronic switching module and electronic switching modules of the other basic electromagnetic components comprised by the electric motor or generator are controlled by an integrated electronic speed controller (ESC) or control units built together with the switching modules of the electric motor or the generator.

6. The basic electromagnetic component according to claim 1, wherein continuous or stepped rotation or linear sensors are used for sensing position of the rotor or linear motion of an electric motor or generator and hence, by the aid of sensors, timing of switching and/or inverting each half-wave of phase coils or phase coil sets are adjusted for the correct moment decided by the control unit.

7. The basic electromagnetic component according to claim 3, wherein voltage sensors are installed for sensing voltage of a DC power source connected to it and switching phase coil segments in a manner of parallel or series or combinations of these to adapt motor or generator voltage to power source voltage.

8. The basic electromagnetic component according to claim 3, wherein voltage sensors are being used for sensing polarity of an AC power source connected to it and to invert polarity of phase coil segments by each half-wave of the AC input power to make the motor or generator run with AC input power.

9. The basic electromagnetic component according to claim 3, wherein the switching modules are used and installed for braking and/or energy recovery of a vehicle or lift or other means of transport, by adjusting motor or generator output voltage and power to control braking force and to recover braking and/or downwards movement of energy, either to feed it back to the electric power source like mains network or to recover power for charging batteries, capacitors or other means of electric or electromechanical energy storage, to be reused later.

10. An electromagnetic power unit comprising basic electromagnetic components, wherein:

each of the basic electromagnetic components comprises:
an electromagnetic circuit comprising a U-shaped magnetic core, at least two separate phase coils, and a permanent magnet; and
electronic or electromechanical switches for connecting the at least two separate phase coils to phase coils of other ones of the basic electromagnetic components during motor or generator operation of the basic electromagnetic components, the at least two separate phase coils being pre-wound separately from the U-shaped magnetic core and the at least two separate phase coils being combined with the U-shaped magnetic core removable, and a motor, a generator or a linear motor implemented with the basic electromagnetic components is connectable for different current and voltage values by changing connections of the phase coils of the basic electromagnetic components with the aid of the electronic or electromechanical switches of the basic electromagnetic components.

11. Electromagnetic power unit according to claim 10, wherein the power unit is designed to be installed to use as one or more units composed two basic parts of coil and magnetic core, and of one or more optional parts like permanent magnet and/or control unit, so that the coils and magnetic cores composing the basic electromagnetic component and the optional control unit are typically in the fixed stator of electric motor or generator, and the moving rotor contains either permanent magnets or other basic components according to the invention.

12. Electromagnetic power unit according to claim 10, wherein the permanent magnets are placed to stator and magnetic cores and coils to rotor.

13. Electromagnetic power unit according to claim 10, wherein the permanent magnets placed either to rotor or to stator are spaced evenly or unevenly.

14. Electromagnetic power unit according to claim 10, wherein the electromagnetic power unit is controlled by an electronic control unit, either optically or with optical fibre or with optical sensor or by any means of wired or wireless control.

15. Electromagnetic power unit according to claim 10, wherein the basic electromagnetic components are arranged to several rows axially or parallel to the shaft.

16. Electromagnetic power unit according to claim 10, wherein the basic electromagnetic components are arranged around common axle radially or parallel to the radius to several circumferences.

* * * * *